United States Patent [19]
Suzuki

[11] Patent Number: 5,742,356
[45] Date of Patent: Apr. 21, 1998

[54] MOBILE BODY TV RECEIVER HAVING OPTIMAL DISPLAY FRAME PATTERN SELECTION CAPABILITY

[75] Inventor: Takao Suzuki, Anjo, Japan

[73] Assignee: Denso Corporation, Kariya, Japan

[21] Appl. No.: 745,661

[22] Filed: Nov. 8, 1996

[30] Foreign Application Priority Data

Nov. 9, 1995 [JP] Japan ............................ 7-291506

[51] Int. Cl.⁶ ............................................. H04N 5/44
[52] U.S. Cl. ........................... 348/607; 348/614; 348/620
[58] Field of Search ........................ 348/553, 607, 348/614, 620; 370/537; 375/232; H04N 5/44

[56] References Cited

U.S. PATENT DOCUMENTS

| | | | |
|---|---|---|---|
| 5,638,134 | 6/1997 | Kameyama | 348/607 |
| 5,648,987 | 7/1997 | Yang | 348/607 |
| 5,651,010 | 7/1997 | Kostreski | 348/614 |
| 5,657,401 | 8/1997 | De Haan | 348/607 |

FOREIGN PATENT DOCUMENTS

| | | |
|---|---|---|
| 3-280674 | 12/1991 | Japan. |
| 4-70067 | 3/1992 | Japan. |
| 4-247785 | 9/1992 | Japan. |
| 5-328240 | 12/1993 | Japan. |

*Primary Examiner*—Howard W. Britton
*Attorney, Agent, or Firm*—Cushman, Darby & Cushman IP Group of Pillsbury, Madison & Sutro LLP

[57] ABSTRACT

An antenna and a tuner are used for receiving TV signals that carry static images at 30 frames per second. Fifteen frame memories are provided in a image memory unit and a microprocessor sequentially stores the received images in each of the frame memories and evaluates the quality of each of the stored images. Furthermore, display patterns are obtained by varying frame speeds and phases with the image quality for each display pattern being evaluated thereafter. The pattern having the highest score is selected and the oldest image among the images stored corresponding to the selected pattern is displayed on the display in accordance with a predetermined condition.

13 Claims, 18 Drawing Sheets

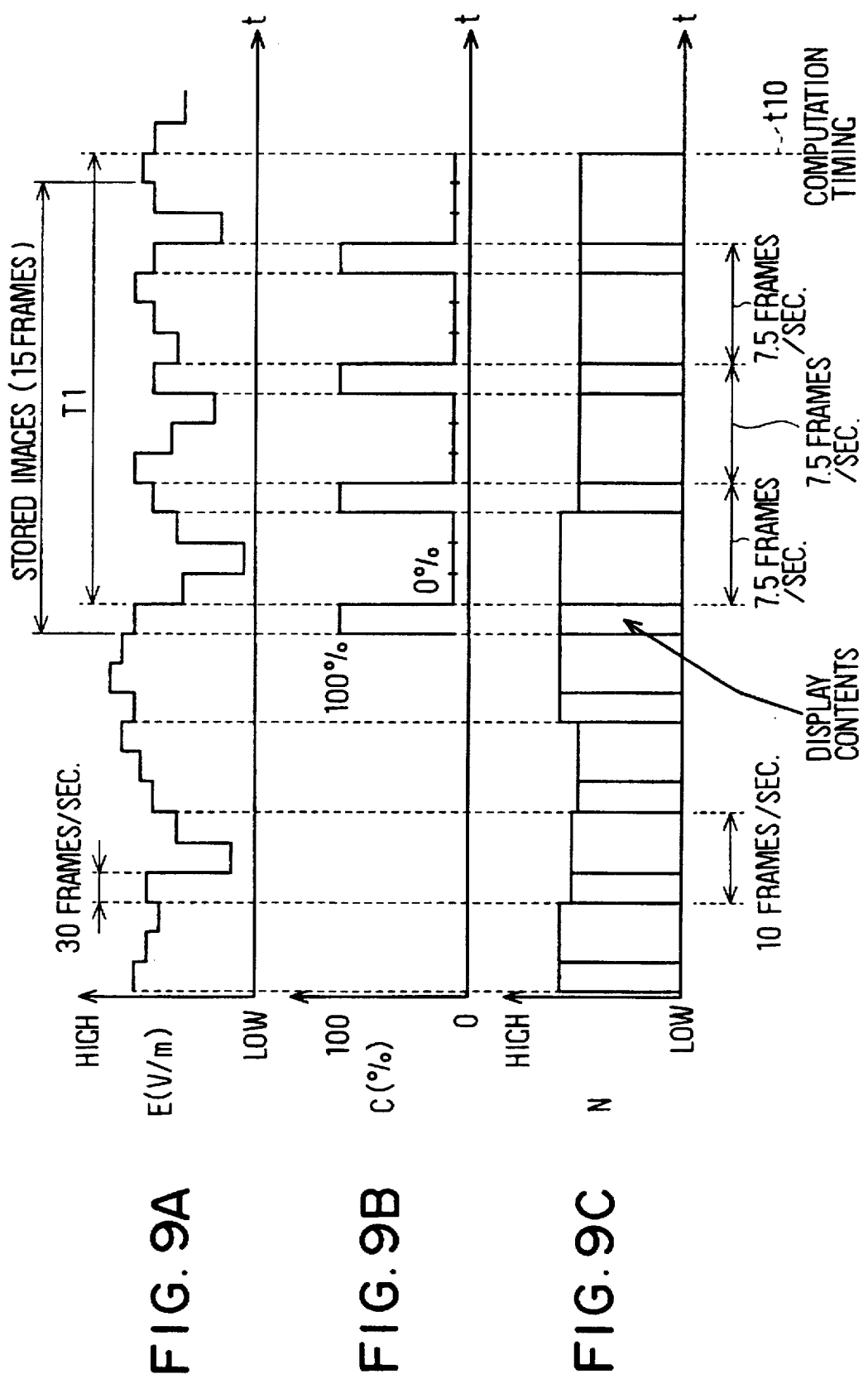

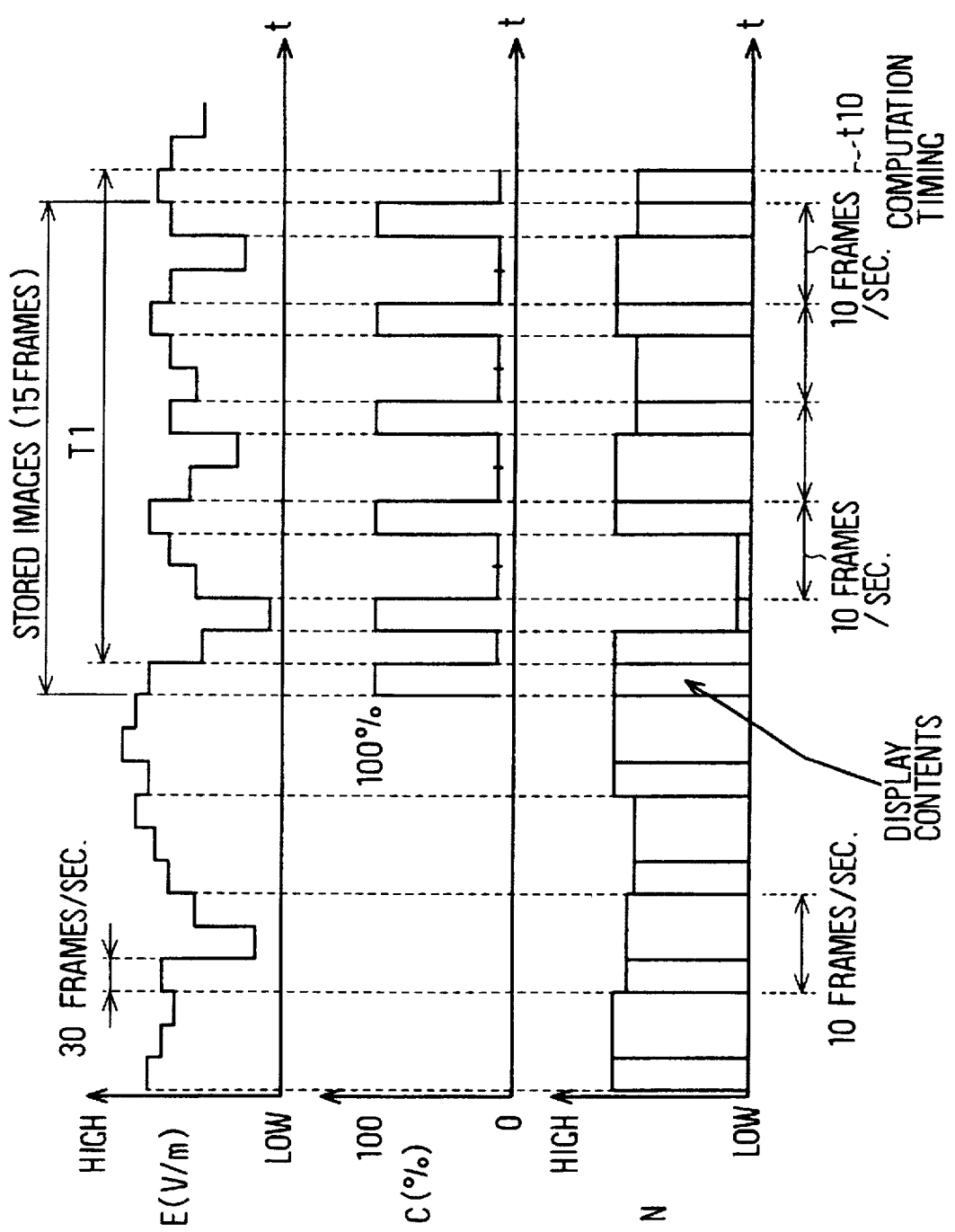

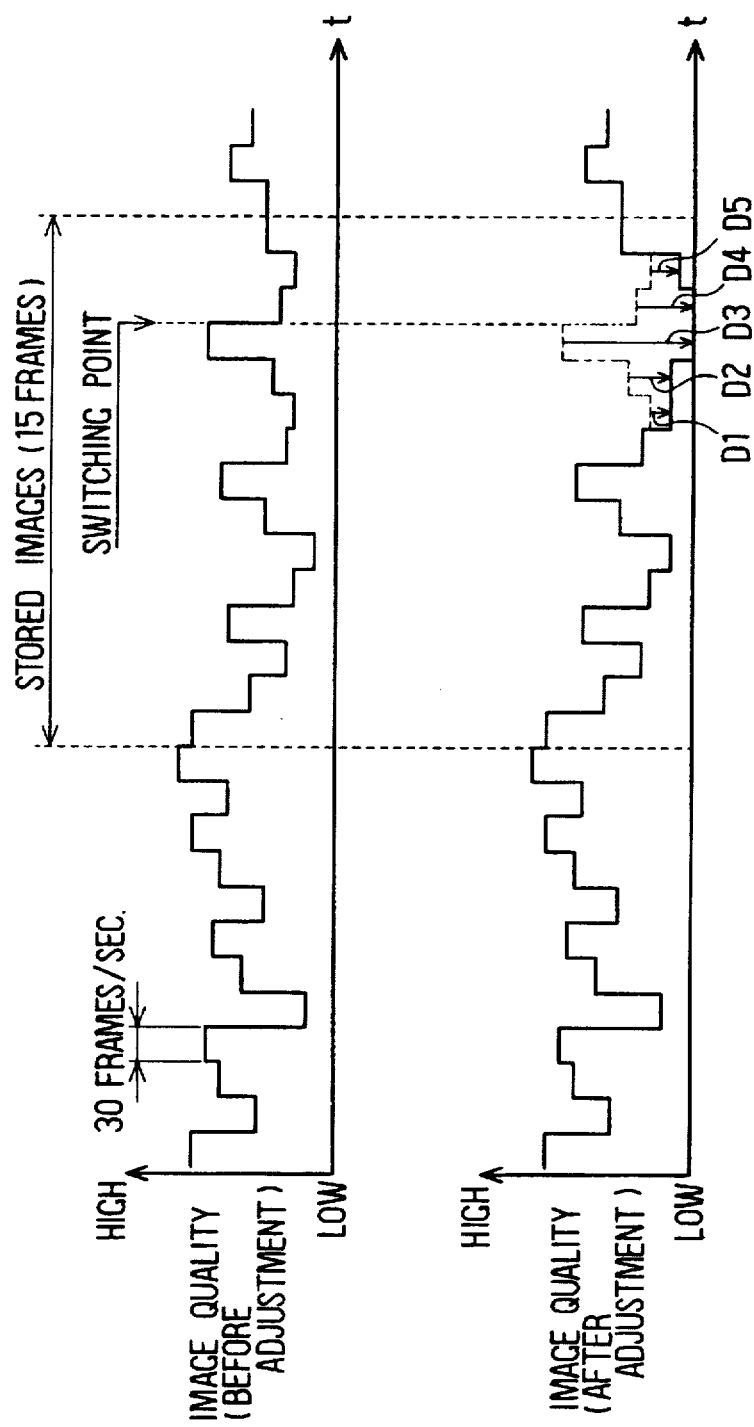

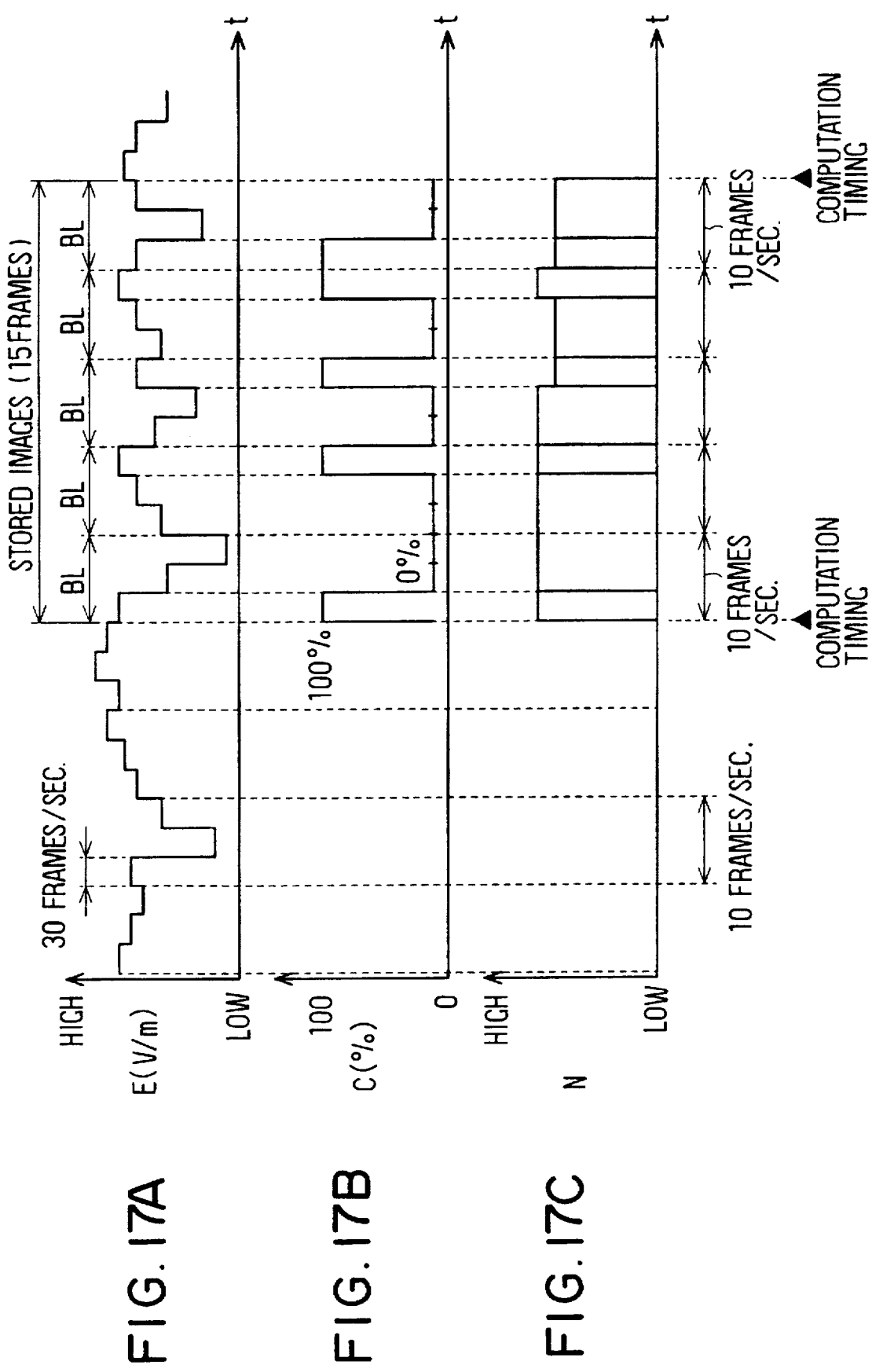

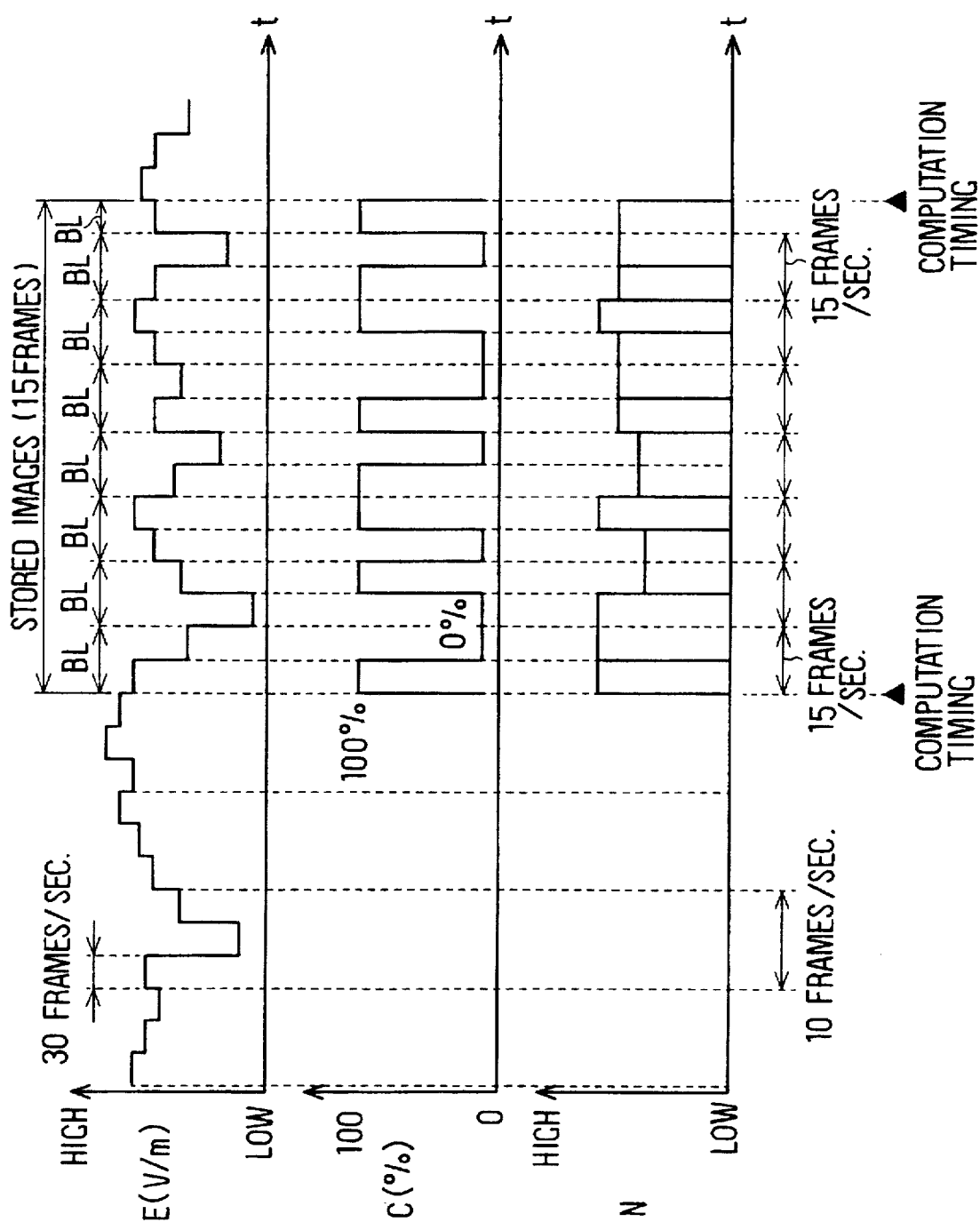

MOBILE BODY TV RECEIVER HAVING OPTIMAL DISPLAY FRAME PATTERN SELECTION CAPABILITY

CROSS REFERENCE TO RELATED APPLICATION

This application is based on and claims priority from Japanese Patent Application No. Hei-7-291,506, the contents of which are incorporated herein by reference.

BACKGROUND OF THE INVENTION

1. Field of the Invention

The present invention relates to a TV receiver which is installed in a mobile body such as a vehicle or the like.

2. Description of Related Art

When a TV receiver installed in a vehicle receives a TV broadcast signal while the vehicle is moving, a ghosting effect, a fading effect or the like may appear in the images displayed by the TV receiver which can be attributed to flickering, roughness, superposition and the like. In this way, the quality of the received image deteriorates to a level where a viewer finds the display unpleasant to view. The ghosting effect and the fading effect occur mainly when a main signal and a reflection signal interfere with each other. Thus, while these effects appear to be slightly different from each other, they are both caused by the interference of the reflection signal with the main signal. In other words, these phenomena usually occur simultaneously.

Here, the reception of TV signals by the TV signal receiver that is installed in a vehicle is explained hereinafter.

Generally, a broadcasting signal transmitted from a signal transmitter not only includes a main signal (direct wave signal) that reaches the TV receiver but also a reflection signal that is reflected from the ground, buildings, mountains and the like. This reflection signal is an interference signal. There are two main types of interference which are namely flicker effect and superposed reception. When the reflected signal reflected from the ground interferes with the main signal, a standing wave whose field intensity variation is stationary over a period of time is produced. When the vehicle installed with the TV receiver moves into a region where such standing waves exist, flicker effect in the received image, in other words, fading, occurs in the displayed image. Furthermore, superposed image reception occurs when the reflection signal reflected by the buildings and the mountains interferes with the main signal. When the vehicle installed with the TV receiver moves into an area where the reflection signal reflected by buildings and the like interferes with the main signal, the reception condition of the TV receiver varies incessantly. This interference produces images which are unpleasant for viewing. In this way, it can be said that the reception condition of the TV signals is image quality itself.

FIGS. 20A through 20D illustrate temporal changes in the image quality (signal reception condition) of signals received by the TV receiver that is installed in the vehicle.

FIG. 20A illustrates the case when the received image is clear, the image quality is high and temporal changes in the image quality are minimal. In this case, the field intensity of the reception signal is strong, there is little signal disturbance and the image does not flicker, and thus, clear images can be received.

FIG. 20B illustrates the case when the received image is poor, the image quality is low and temporal changes in the image quality are minimal. In this case, the field intensity of the reception signal is weaker than the signal disturbance and the image is not smooth and so, clear images are seldom received.

FIGS. 20C and 20D illustrate cases when the quality of the received images vary through time due to signal disturbances such as fading, ghosting effect and the like. For these cases, the field intensity of the reception signal is weaker than the signal disturbance and the image is not smooth. Even though clear images can be received, such images are suddenly impaired by flicker effect and ghosting effect. As described before, this is because the vehicle loaded with the receiver is moving in an unstable region where there is signal disturbance. Therefore, depending on the travelling speed and the signal reception condition of an area, flickering of the reception signal can occur periodically as shown in FIG. 20C or randomly as shown in FIG. 20D.

In this way, the situations are different for the case when the TV receiver is fixed such as those for residential use and for the case when the TV receiver is installed in a moving vehicle or the like. Because a large directional antenna is usually provided for the fixed TV receiver, the reception signal condition is fine and seldom fluctuates. However, because only a small non-directional antenna is provided for the TV receiver installed in moving vehicles or the like, the reception condition of the TV signals may be poor most of the time with reception conditions varying incessantly. This is the reason why reception performance of the TV receivers installed in vehicles is generally unsatisfactory.

To deal with this, Japanese Patent Laid-Open Publication No. Hei 3-280674, for example, discloses a technology which uses an image frame memory provided in the TV receiver to store a latest excellent frame of a display image and which switches to displaying such latest excellent static frame and suspending the display of unpleasant reception images when TV signal reception condition worsens. As a result, display of unpleasant and poor quality images can be prevented and a clear image can be displayed to the viewer.

However, switching to a static image when the reception state worsens is not preferable from the point of view of continuity of movement in the displayed images (i.e., smooth movement in the display). That is, even though a proper value can be set as a threshold value for evaluating image quality and for determining whether or not a static frame is to be used or not, moving images cannot be displayed.

Meanwhile, Japanese Patent Laid-Open Publication No. Hei 5-328240, for example, discloses one other technology for reducing a speed for updating the images to display image frame by frame when there is severe flickering in the displayed image of the TV receiver while the vehicle is travelling or the like. As a result, because the time interval between each flickering can be relatively increased, clear images can be provided to the viewer.

However, flicker effect, roughness, superposition and the like do not occur at constant periods and their occurrence cannot be predicted based on the speed of the mobile body. However, even if it happens that such flicker effect or the like occurs periodically, as shown in FIG. 21, while the effects of a poor quality image may be accidentally reduced through averaging when sampling is carried out at a timing tsamp to produce clear images, poor images will be displayed when sampling is carried out at a timing tsamp. Thus, in the latter case, the poor images become noticeable because they are displayed continuously for a plurality of frames. Thus, this method does not inherently provide excellent images to the viewer.

SUMMARY OF THE INVENTION

In view of the foregoing problems, it is a primary object of the present invention to provide a TV receiver for a mobile body which displays images of high quality and images which show smooth movement To achieve the above-described objects, a first aspect of the present invention provides a TV receiver for use in a mobile body. The TV receiver includes a reception unit, a display unit, a memory unit, an image quality detection unit, a pattern selection unit and a control unit. The reception unit is for receiving a TV signal which carries a set of static frame images per unit time. The display unit is for displaying the static frame images received by the reception unit. The memory unit is for sequentially storing the set of static frame images received by the reception unit. The image quality detection unit is for detecting image quality of each of the static frame images stored in the memory unit. The pattern selection unit is for determining an optimal display pattern for displaying the set of static frame images in the display unit by setting at least one of a frame speed and a frame display position to different values to obtain a plurality of display patterns. The pattern selection unit obtains an evaluation value of each of the display patterns based on the image quality detected by the image quality detection unit. The frame speed is a speed for displaying the static frame images in the display unit. The frame display position indicates which of the static frame images will be displayed in the display unit. The control unit is for controlling the display unit to display the static frame images stored in the memory unit based on the optimal display pattern determined by the pattern selection unit. In this way, the TV receiver can display images which are of high quality and which show smoothness in movement.

An additional aspect of the present invention provides the TV receiver wherein the image quality detection unit detects image quality based on a field intensity of the received image frames. In this way, image quality of the received frames can be evaluated easily.

Another aspect of the present invention provides the TV receiver which further includes a vehicle stoppage detection unit for detecting a stoppage in movement of the moving body. Here, the pattern selection unit sets the frame speed to a predetermined maximum value when the vehicle stoppage detection unit detects the stoppage. The maximum value is set to be more than the largest value of the frame speed when the vehicle is moving. In this way, smoother images can displayed by the TV receiver when the vehicle is at a stop.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 9A to 9C are time charts showing an operation of the microprocessor according to the first embodiment;

FIGS. 11A to 11C are time charts showing an operation of the microprocessor according to the first embodiment;

FIGS. 13A and 13B are time charts showing an operation of the microprocessor according to the second embodiment;

FIGS. 17A to 17C are time charts showing the operation of microprocessor according to the third embodiment;

FIGS. 18A to 18C are time charts showing the operation of the microprocessor according to the third embodiment;

DETAILED DESCRIPTION OF PRESENTLY PREFERRED EXEMPLARY EMBODIMENTS

Preferred embodiments of the present invention are hereinafter described with reference to the accompanying drawings.

A first embodiment of the present invention is explained with reference to the accompanying drawings.

Figure 1:
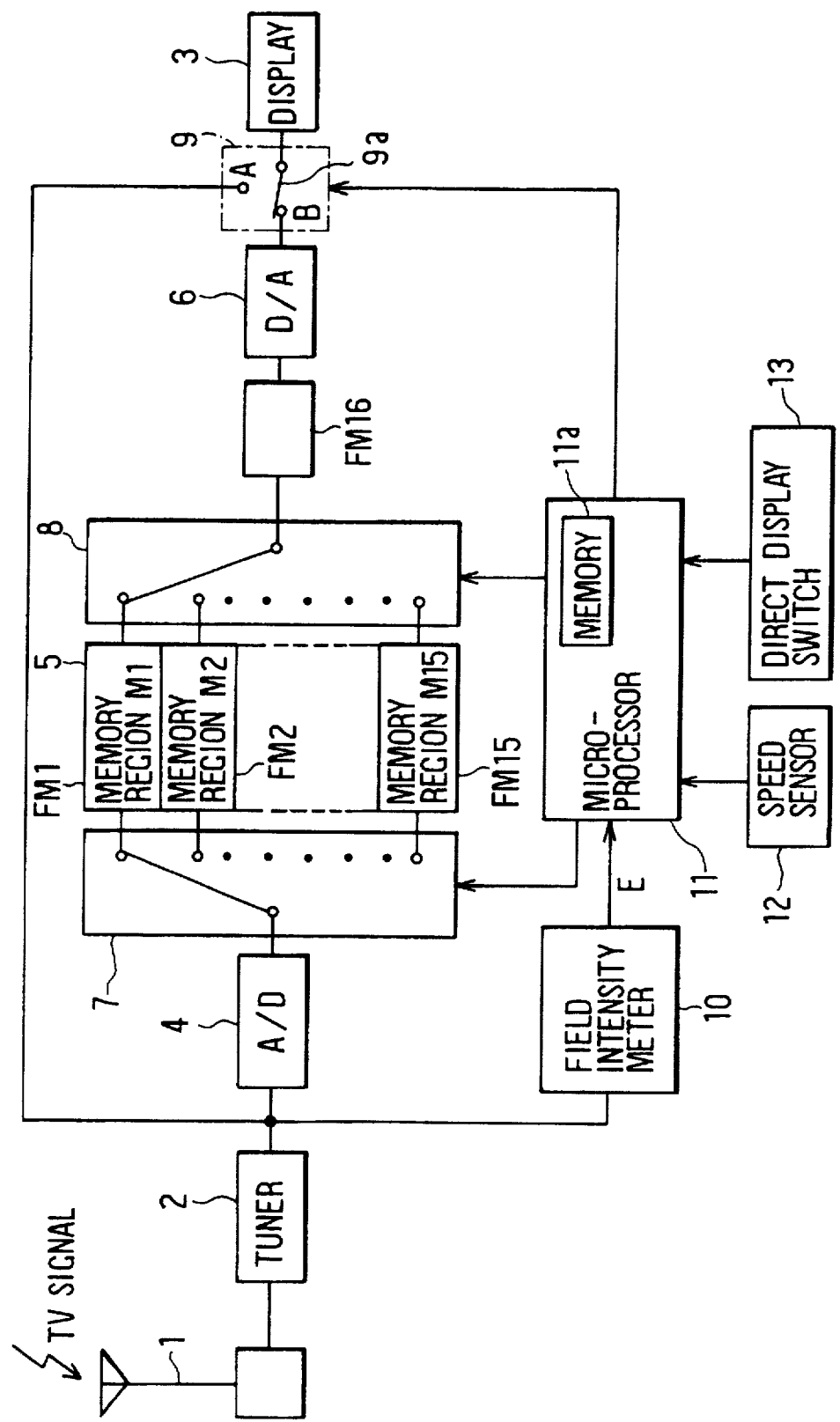
FIG. 1 is a block diagram showing an overall construction of a TV receiver which is installed in a vehicle.

FIG. 1 illustrates an overall construction of a TV receiver which is installed in a vehicle.

An antenna 1 for receiving TV signals is provided on a roof of the vehicle. Thirty static images are carried by the TV signals in one second. A tuner 2 is connected to the antenna 1. Reception signals selected by the tuner 2 are modulated so that TV images can be displayed in a display unit 3.

An image memory unit 5 is connected to the tuner 2 via an A/D converter 4 and an input control circuit 7. The image memory unit 5 includes fifteen memory regions FM1–FM15 and each of the memory regions FM1–FM15 is for storing one static image frame. In other words, these memory regions FM1–FM15 can store a total of 0.5 seconds (fifteen frames) of images.

Control of the switching between the A/D converter 4 and each of the memory regions FM1–FM15 and storage of image data into the memory regions FM1–FM15 is carried out by the input control circuit 7 that is disposed between the A/D converter 4 and the image memory unit 5. That is, the A/D converter 4 and the memory region FM1, the A/D converter 4 and the memory region FM2, . . . , and the A/D converter 4 and the memory region FM15 can be selectively connected to store data in each of the memory regions FM1–FM15.

A memory region FM16 is connected to the image memory unit 5 via an output control circuit 8. Switching between each of the memory regions –and the memory region FM16 and sending of the image data from the memory regions FM1-FM15 to the memory region FM16 is controlled by the output control circuit 8. That is, the memory region FM1 and the memory region FM16, the memory region FM2 and the memory region FM16 and so on can be selectively connected so that the data in each of the memory regions FM1–FM15 can be transmitted to the memory region FM16.

The display 3 is connected to the memory region FM16 via a D/A converter 6 and a switch 9. The switch 9 has a contact 9a which when switched to an A side enables the direct transmission of a signal from the tuner 2 to the display 3. On the other hand, a signal of the D/A converter 6 can be transmitted to the display 3 when the contact 9a is switched to a B side. Normally, the contact 9a is switched to the B side.

A field intensity meter 10 is connected to the tuner 2. This field intensity meter 10 measures the field intensity of each image in the TV signal received via the tuner 2.

A microprocessor 11 is connected to the field intensity meter 10 for determining a field intensity value E of signals from the field intensity meter 10. The microprocessor 11 controls both the input control circuit 7 and the output control circuit 8. A memory 11a is provided in the microprocessor 11 for storing the field intensity values E for fifteen frames detected by the field intensity meter 10. That is, the field intensity value E of each image stored in each of the memory regions FM1–FM15 of the image memory unit 5 is stored in this memory 11a.

Meanwhile, a frame speed (frame transmission rate) r is explained hereinafter. The framer speed r refers to the number of the static images displayed by the display 3 per unit time. In the present embodiment, the frame speed r will be 30 frames/second when the received TV signals are directly displayed in the display 3. Therefore, the speed for updating 30 frames of images in one second is defined to be 30 frames/second. Moreover, when only one frame is updated for every three static frames, ten frames will be updated in one second, and thus, the frame speed r will be 10 frames/second.

A speed sensor 12 is connected to the microprocessor 11. The microprocessor 11 determines whether or not the vehicle is at a stop based on a signal from the speed sensor 12. Furthermore, a direct display switch 13 is connected to the microprocessor 11. When actuated by a passenger of the vehicle, this direct display switch 13 provides a signal indicative of its actuation to the microprocessor 11.

In the present embodiment, the microprocessor 11 includes an image input unit, an image evaluating unit, a pattern selecting unit and an image display control unit.

Next, an operation of the TV receiver used in the vehicle is described hereinafter.

FIGS. 2 through 6 are flow charts of processes that are executed by the microprocessor 11. FIGS. 7A–11C are time charts showing temporal changes in the image quality of the static frames.

Figures 7A, 7B, 7C:
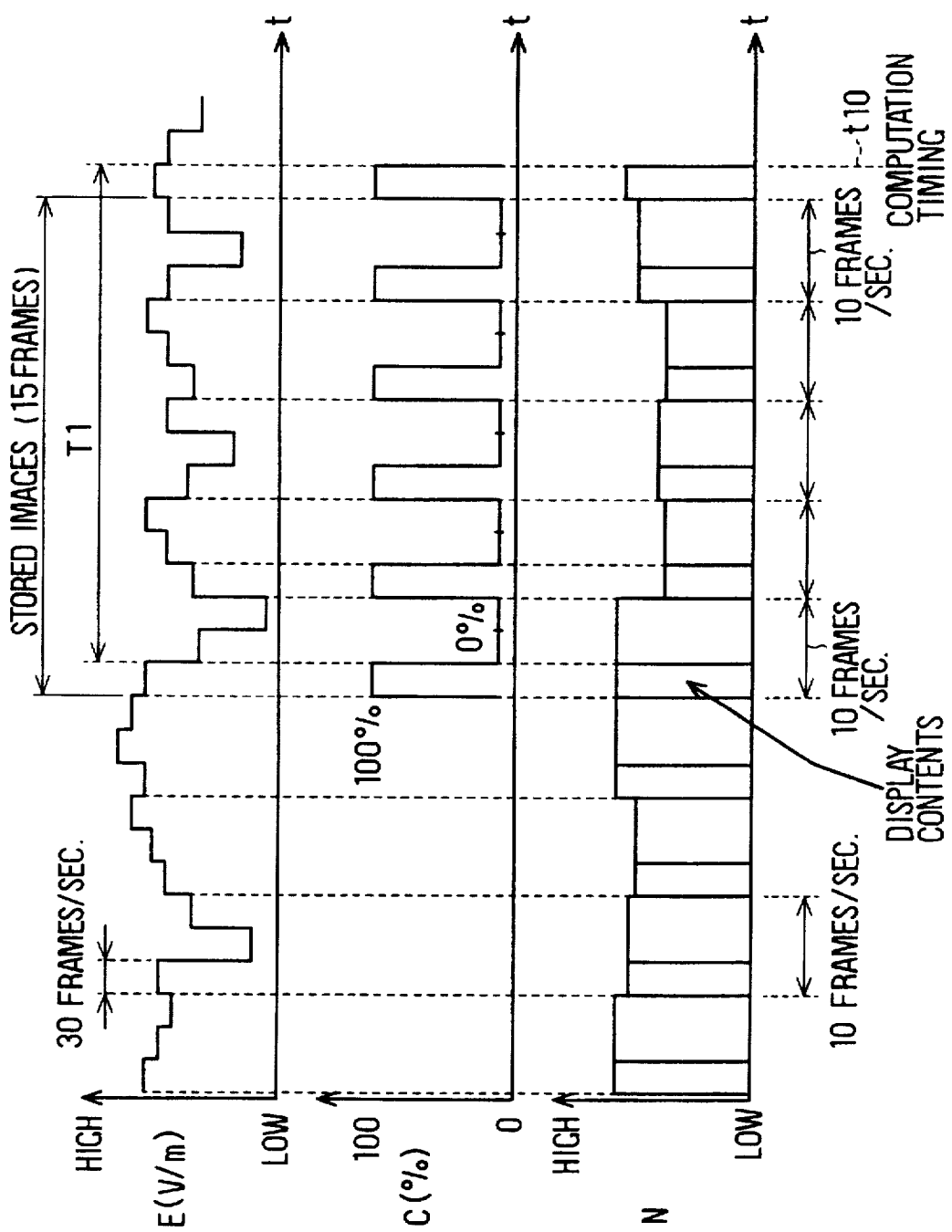
FIGS. 7A to 7C are time charts showing an operation of the microprocessor according to the first embodiment.

FIGS. 7A through 7C show the case when the display 3 displays ten static frames per second, i.e., the frame speed r is 10 frames/second. To put it more concretely, FIG. 7A is a graph that illustrates the image quality of each received frame with the horizontal axis indicating elapsed time and the vertical axis indicating the image quality (field intensity) of the frames. That is, FIG. 7A illustrates the reception of frames of varying field intensities (image quality). In this same figure, one unit of the time axis is equivalent to 1/30th of a second. FIG. 7A illustrates the storage of fifteen frames of images for a total duration of 0.5 seconds in the image memory unit 5. FIG. 7B illustrates a frame speed r and an image selection position as a sampling window of the image. The frame speed r and the frame selection position are expressed as a pulse wave which indicates an image usage rate C that can either be 0% or 100%. In this way, changes in the frame speed r and the image selection position affects the waveform of the image usage rate C. FIG. 7C illustrates the actual frames to be transmitted for display in the display 3. In FIGS. 7A through 7C, for every three frames, only one frame is displayed while the two remaining frames are discarded.

Figure 2:
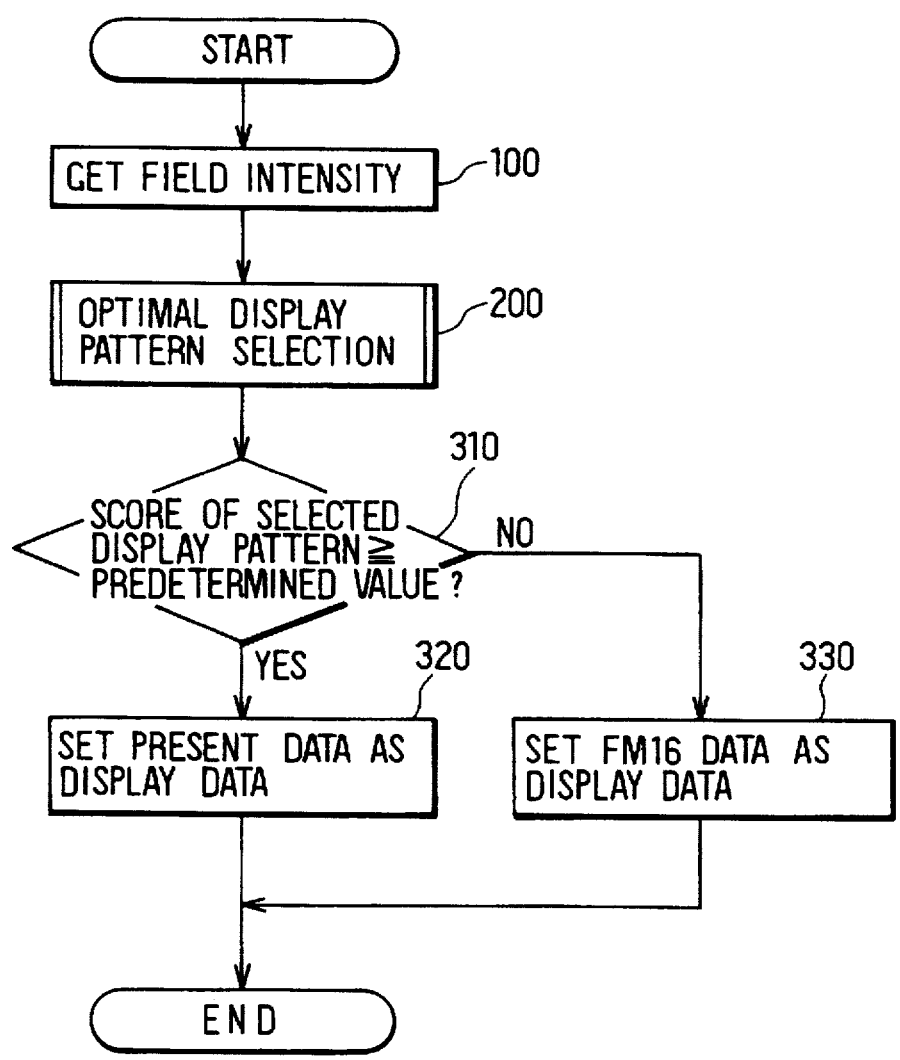
FIG. 2 is a flow chart of a main procedure executed by a microprocessor of the TV receiver according to a first embodiment of the present invention.

Meanwhile, the microprocessor 11 executes a process shown in FIG. 2 every 1/30th of a second. Step 100 controls the input control circuit 7 to store images being received in succession in each memory region FM1–FM15 of the image memory unit 5. That is, the microprocessor 11 always stores 0.5 second length (15 frames) of the latest images and the contents of the memory regions FM1–FM15 are updated whenever new images are received. To put it more concretely, updating of the stored images is performed by updating contents of the memory region that has the oldest image with the latest image and thus, 0.5 seconds (fifteen frames) are always stored in the memory regions FM1–FM15 of the image memory unit 5. In this way, the procedure of FIG. 2 is performed every 1/30th of a second to process the latest set of 15 frames stored in the image memory unit 5.

Furthermore, at the same time, the microprocessor 11 reads the field intensity value E provided by the field intensity meter 10 and successively stores the detected value in the memory 11a to correspond to the images stored in the image memory unit 5.

Figure 3:
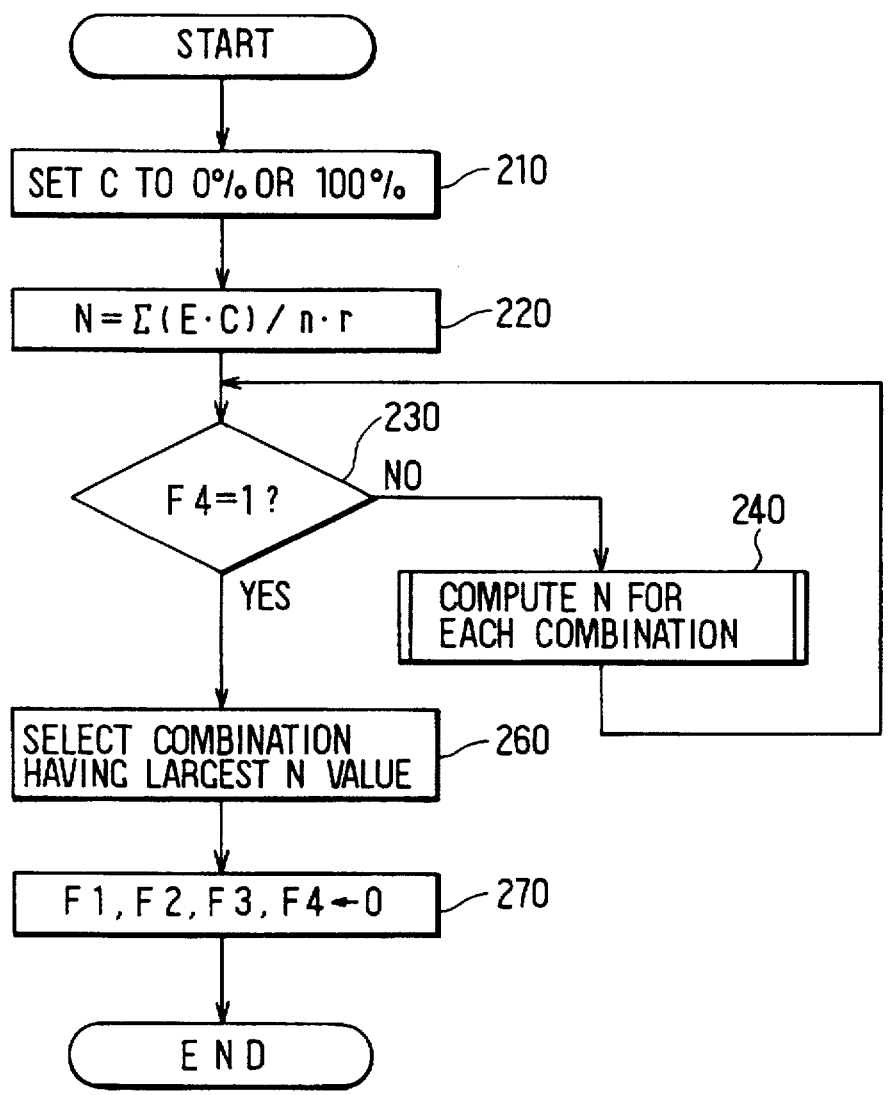
FIG. 3 is a flow chart of an optimal display pattern selection procedure executed by the microprocessor according to the first embodiment.

Step 200 selects an optimal display pattern which represents an optimal combination of the frame speed r and the image selection position. The image selection position indicates the frame that is to be displayed in the display 3. That is, step 200 determines the optimal frame speed r and the selected position for the images stored in the image memory unit 5 by adjusting the waveform of the image usage rate C whose frequency indicates the frame speed r and whose peak indicates the image selection position. FIG. 3 illustrates this selection process in more detail.

In FIG. 3, step 210 maintains the image usage rate C based on the present frame speed r and the present phase of the waveform of the image usage rate C. It must be noted here that the present frame speed r is always set to the optimal frame speed which is discussed later. Here, the present frame speed r is, for example, 10 frames/second and thus, with the frame speed r at 10 frames/second and images being received at 30 frames/second, the image usage rate C is adjusted to either 0% or 100% so that only one frame will be selected from every set of three frames. In this way, in FIG. 7B, the frame speed r at the computation timing t10 is 10 frames/second and because the timing t10 is a timing at which an image that is the same as the originally received image at the same point in time is displayed, the image usage rate C is set to be 100%. FIG. 7B shows the display pattern when the present speed and the phase are maintained. At the computation timing t10 in FIG. 7B, fifteen frames are stored in the image memory unit 5 within time period T1.

To obtain an overall score N for the 15 frames of images, step 220 computes the image evaluation value (=C·E) for each frame of the set of fifteen frames in the image memory unit 5 by multiplying the field intensity E corresponding to each frame and the corresponding image usage rate C. Then, step 220 computes a total value Σ(C·E) of the image evaluation values, divides this total value Σ(C·E) by a number n which indicates the number of frames whose image usage rate C is 100% and multiplies with this result the frame speed r to finally obtain the overall score N. In FIG. 7B, n is 5. In this way, step 220 computes the overall score N for a display pattern of 15 frames for the case when the present frame speed r and the phase are maintained.

This overall score N generally increases when the quality of the selected image as indicated by the field intensity E improves and also when the frame speed r becomes faster. Conversely, the overall score N generally decreases when the quality of the image deteriorates and also when the frame speed r becomes slower.

Figure 4:
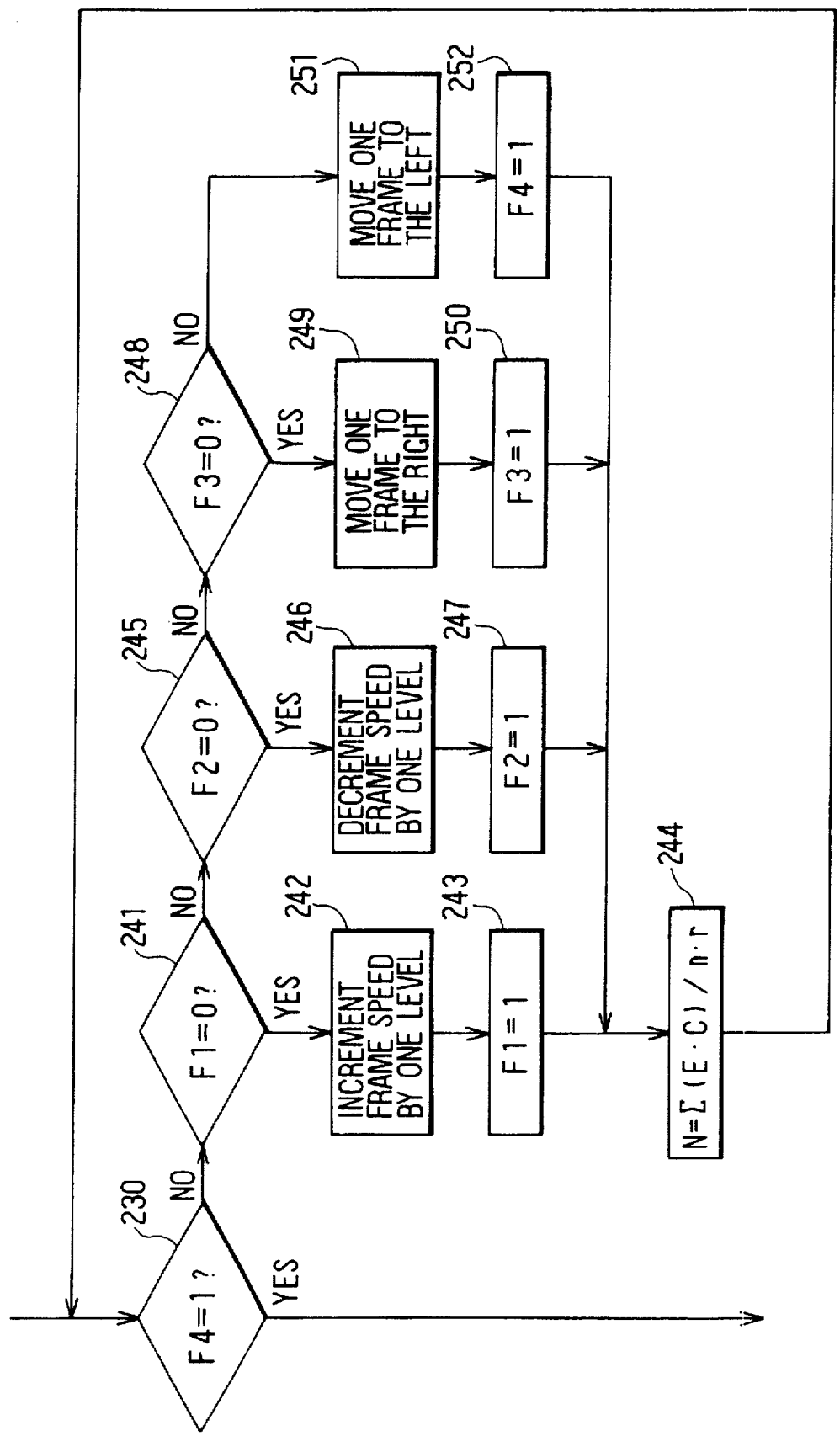
FIG. 4 is a flow chart of an image evaluation procedure executed by the microprocessor according to the first embodiment.

Step 230 determines whether or not a flag F4 is set. Because the flag F4 is initially reset, control goes to step 240. Step 240 computes the score N for each type of display pattern obtained by varying the frame speed r and the phase from the original frame speed r and phase which are shown in FIG. 7C. This variation in the frame speed and the phase is performed here by adjusting the frequency and the phase of the waveform of the image usage rate C. FIG. 4 illustrates the details of this computation process of step 240.

Figures 8A, 8B, 8C:
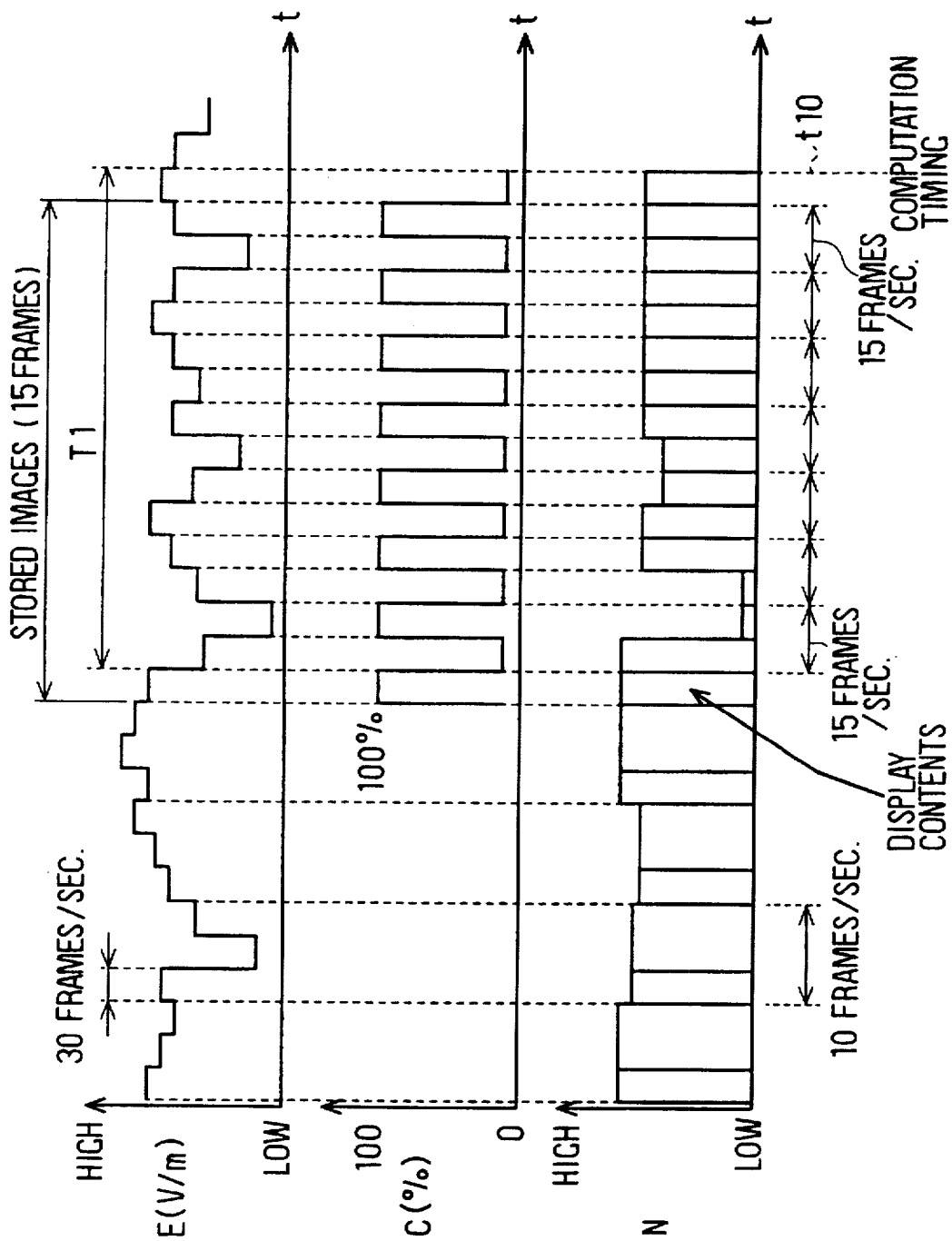
FIGS. 8A to 8C are time charts showing an operation of the microprocessor according to the first embodiment.

Step 241 determines whether or not a flag F1 is reset or not. Because the flag F1 is initially reset, control goes to step 242 which increases the frame speed r by one level to, for example, 15 frames/second from the present frame speed, i.e., 10 frames/second. FIGS. 8A-8C illustrate the case when the frame speed r is raised to 15 frames/second. Here, the frame speed r is raised to 15 frames/second by setting the image usage rate C of one static frame in every set of two received frames to be 100%. FIG. 8C shows the display pattern when the frame speed r is raised by one level.

Step 243 sets the flag F1. The overall score N is then computed as described above.

Regarding the contents of the stored images;, the frame speed r and the frame selection position are changed in the present embodiment to determine the optimal frame speed r when there are low quality image frames mixed among the high quality image frames. Meanwhile, one may opt to select all stored images and set the frame speed r to 30 frames/second when all the stored images are of high quality. However, because the reception state of the TV receiver varies while the vehicle is travelling, it is safe to say that such an ideal state cannot last for a long time. Therefore, it is better to discard some of the image frames without making the viewers feel that there is something wrong with the displayed images even if the reception state is good while the vehicle is travelling so that the amount of adjustments in the frame speed r can be reduced to a minimum in the event the reception state worsens. Thus, in the present embodiment, the maximum frame speed r while travelling is set at 15 frames/second. A frame speed r of 15 frames/second means that the image usage rate C is set to 100% for one frame for every two received frames. Accordingly, only half of the images being received at 30 frames/second will be displayed and thus, the display frame speed will be 15 frames/second. In this way, the microprocessor 11 is provided with a function for limiting the frame speed r.

Because the flag F1 is set, control goes to step 245 via steps 230 and 241. Step 245 determines if a flag F2 is reset or not. Because the flag F2 is initially reset, control goes to step 246 which decreases the frame speed r by one level to, for example, 7.5 frames/second from the present frame speed of 10 frames/second. With the frame speed r set to 7.5 frames/second, the image usage rate C is set to 100% for one frame for every four received frames of images. FIGS. 9A through 9C illustrate the case when the frame speed r is set to 7.5 frames/second. In this way, FIGS. 9A through 9C show display pattern when the frame speed r is lowered by one level.

Step 247 sets the flag F2. The overall score N is then computed as described above.

Figures 10A, 10B, 10C:
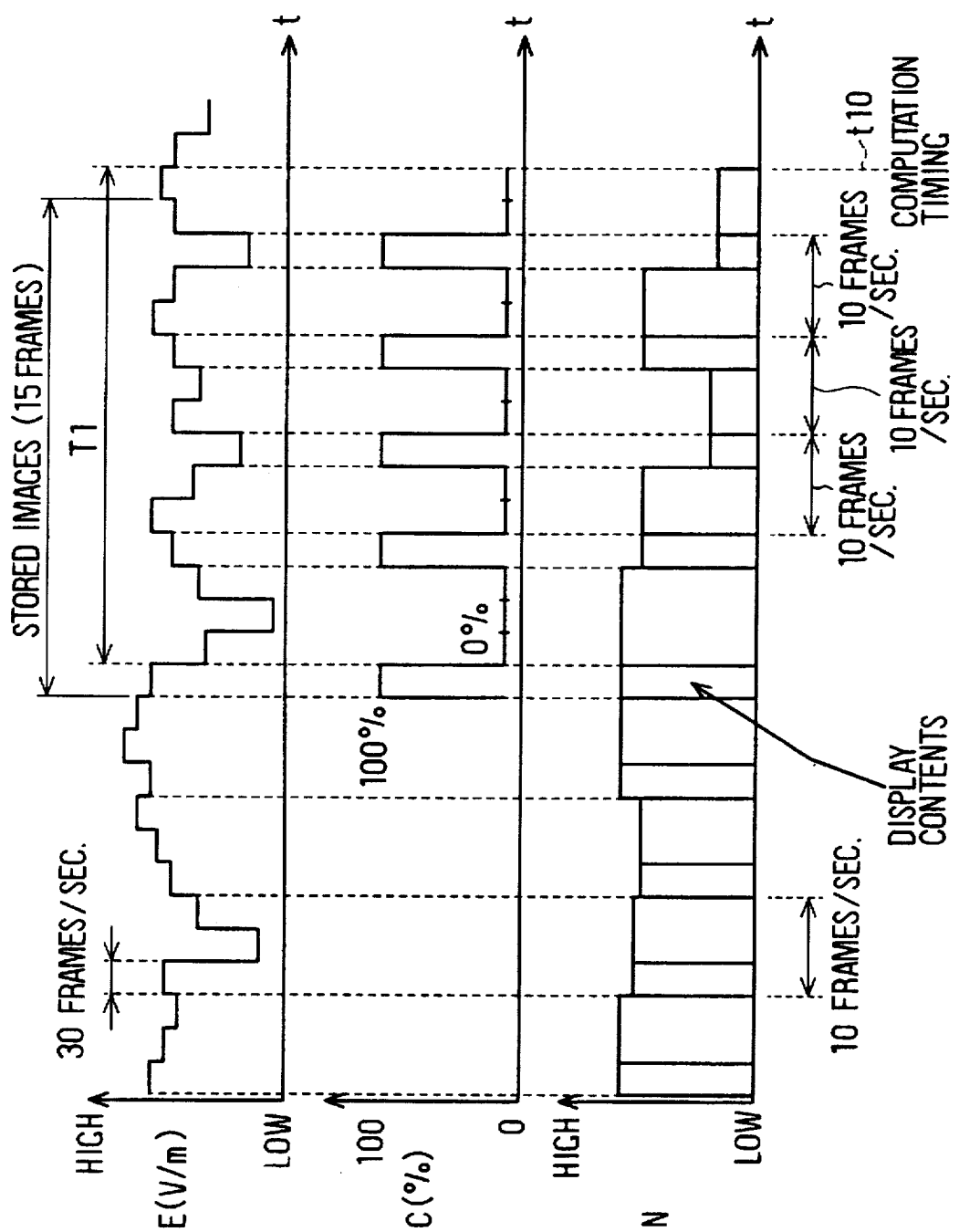
FIGS. 10A to 10C are time charts showing an operation of the microprocessor according to the first embodiment.

Because flags F1 and F2 are set, control goes to step 248 via steps 230, 241 and 245. Step 248 determines whether or not a flag F3 is reset. Because the flag F3 is initially reset, control goes to step 249 which adjusts the image selection position by shifting the waveform pattern of the image usage rate C one frame to the right while maintaining the frame speed r at the present level of 10 frames/second. FIGS. 10A–10C illustrate the resulting pattern after shifting the waveform of the image usage frame C one frame to the right.

Step 250 sets the flag F3. The overall score N is then computed as described above.

Because the flags F1, F2 and F3 are set, control goes to step 251 via steps 230, 241.245 and 248. Step 251 shifts the image selection position to the left by one frame by shifting the waveform pattern of the image usage rate C one frame to the left while maintaining the frame speed r at 10 frames/second. FIG. 11C illustrates the display pattern after shifting the waveform of the usage frame rate C to the left by one frame.

Step 252 sets the flag F4. The overall score N is then computed as described above.

Step 230 gives a positive output because the flag F4 is set and so control goes to step 260. Step 260 selects the pattern having the maximum overall score N among the five patterns discussed above. That is, the microprocessor 11 selects the pattern (combination) having the highest overall score N computed based on the combination of frame speed r and the image selection positions. That is, the microprocessor 11 selects which of the image usage rate C waveform patterns shown in FIGS. 7B, 8B, 9B and 10B brings about the highest overall score N. It must be noted here that the frame speed r of the optimal display pattern is set hereinafter as the present frame speed r.

Step 270 resets each of the flags F1, F2, F3 and F4. Then, control goes to step 310 which determines whether or not the score of the display pattern selected in step 200 is no less than a predetermined value. When the score of the selected pattern is no less than the predetermined value, control goes to step 320 which controls the output control circuit 8 to transfer the oldest frame of all the frames stored in the image memory unit 5 that correspond to the selected display pattern to the memory region FM16. In other words, when the image usage rate C of the oldest frame of all the frames stored in the image memory unit 5 is 100%, the oldest frame is sent to the memory region FM16. However, when the image usage rate C of the oldest frame is 0%, the oldest frame is not sent to the memory region FM16. Instead, the microprocessor 11 displays the image stored in the memory region FM16 in the display 3.

On the other hand, when the score of the selected pattern is less than the predetermined value, step 310 gives a negative output and control then goes to step 330. Step 330 sets a transfer prohibit mode for controlling the output control circuit 8 to set the image data stored in the memory region FM16 as the display data. Then, the microprocessor 11 displays the image stored in the memory region FM16 in the display 3.

The process of FIG. 2 is carried out at every 1/30th of a second. As a result, even if the received images are affected for an instant by the fading effect, ghosting effect and the like, the low quality frames are removed by positioning these images in positions where they will be discarded and not displayed. Moreover, because such positions are constantly being determined, only images of high quality are displayed in the display 3.

In order to obtain a smooth movement in the images, it is better that the frame speed r is constant and as high as possible so that high-quality images showing natural movement can be provided to the viewer. However, when the reception condition is not good, in order to maintain the display of images of high quality, the frame satisfying the minimum required image quality is selected, and such static frame is displayed. In other words, the present invention tries to display the image that has the highest quality and that shows the smoothest movement. Accordingly, the optimal frame speed r and the selected position of the image are determined from the received images.

In the present embodiment, because the images are displayed while changing the frame speed r and the phase in accordance with the reception state of the image signals after storing the images in the image memory unit 5, the viewers view images that are delayed by a processing time (0.5 second) required for determining the optimal display pattern. However, the delayed time may be considered minimal and so, the viewers will not feel anything wrong with the displayed images.

Figure 5:
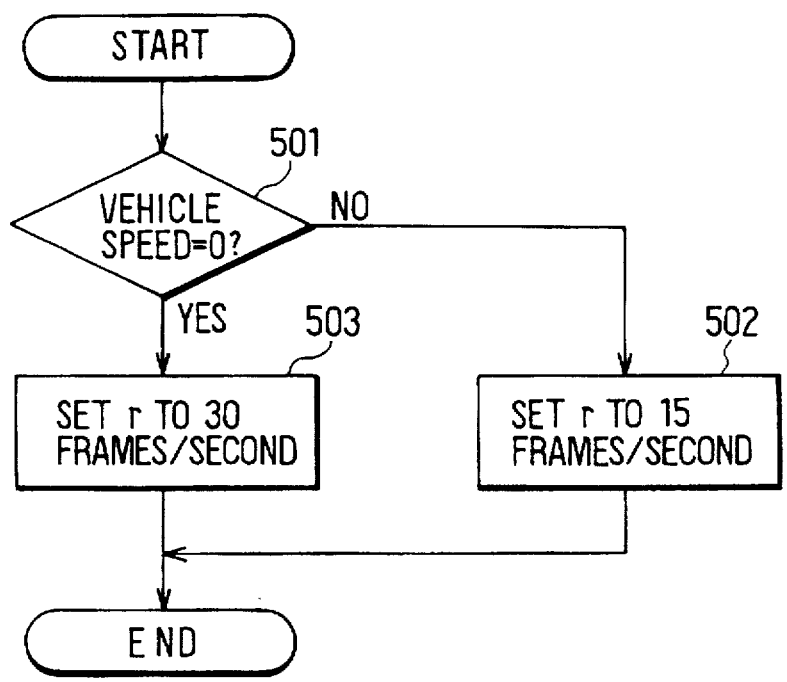
FIG. 5 is a flow chart of a frame speed switching procedure executed by the microprocessor according to the first embodiment.

The microprocessor 11 carries out the process shown in FIG. 5 at every predetermined time period. When step 501 determines that the vehicle is moving based on the signal from the vehicle speed sensor 12, control goes to step 503 which sets the maximum frame speed r to 15 frames/second. When step 502 determines that the vehicle is at rest, step 503 sets the maximum frame speed r to 30 frames/second.

That is, when the maximum frame speed r is always controlled to be 15 frames/second, if the vehicle comes to a stop, the display 3 might look unnatural to the viewer when he looks at the display 3 carefully. This is despite the fact that the reception of TV signals can be affected by other vehicles that are travelling nearby. Therefore, the speed of the vehicle is monitored and when the vehicle comes to a stop, the control range of the frame speed r is widened to 30 frames/second even if the image quality is already good with lower frame speeds. As a result, images which show smooth movement can be displayed.

Figure 6:
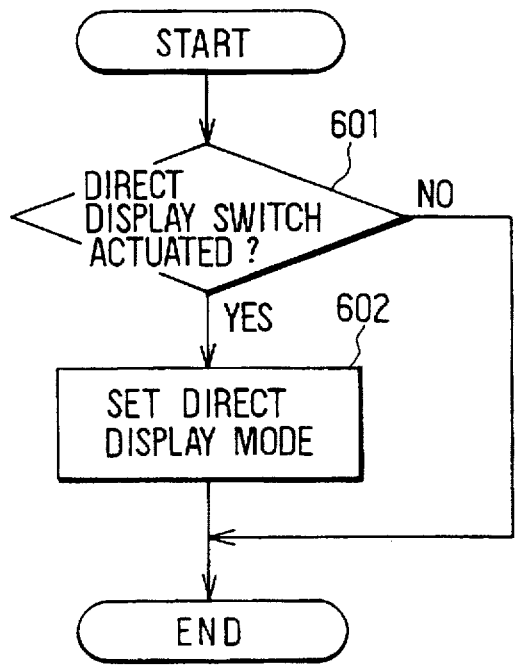
FIG. 6 is a flow chart of a direct display switching procedure executed by the microprocessor according to the first embodiment.

The microprocessor 11 carries out the process shown in FIG. 6 at every predetermined time period. Step 602 switches the contact 9a of the switch 9 in FIG. 1 to the A side when step 601 detects that the direct display switch 13 is actuated. As a result, the signal of the tuner 2 is directly transmitted to the display 3 and the received TV image is directly displayed at real-time without any delays.

That is, normally, because the received image is first stored and only optimal frames are selected and displayed, there will be a time delay in displaying the image. Therefore, when the viewers want to view images at real-time and the like without any delays, he can do so by actuating the direct display switch 13.

Figure 20A:
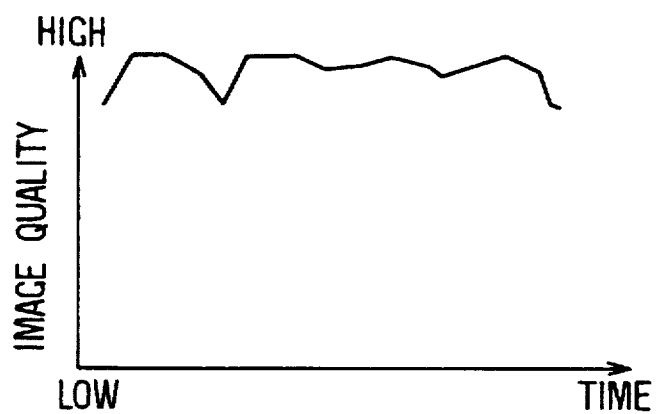
FIGS. 20A to 20D are graphs showing typical temporal changes in reception signal quality.
Figure 20B:
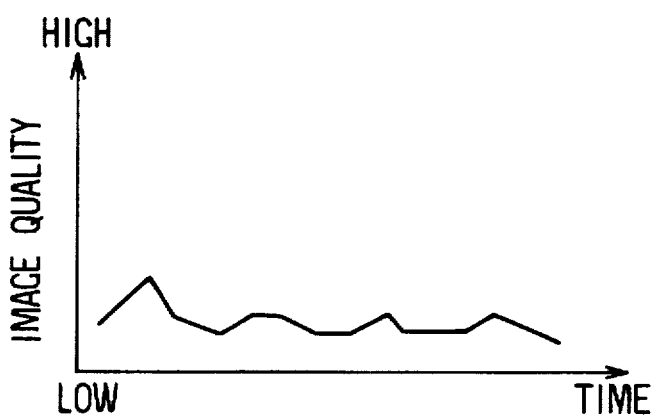
Figure 20C:
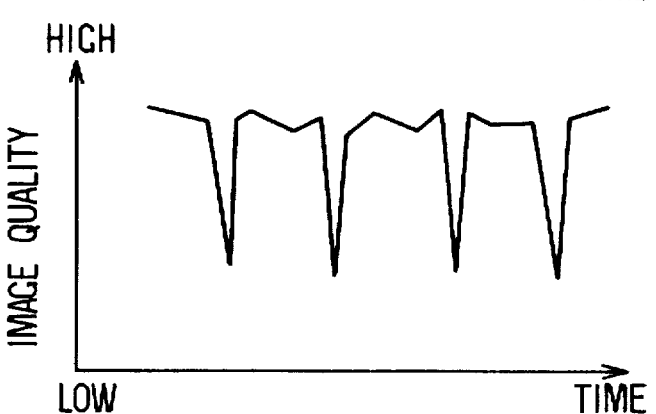
Figure 20D:

In this way, fine images can be received in the case of FIG. 20A using the above-described construction. Because clear images cannot be received in the case of FIG. 20B, the only resort is to display the static images that are stored beforehand. However, in FIGS. 20C and 20D, clear images can be selected and displayed by controlling the optimal frame speed r and the phase.

In the present embodiment, the image memory unit 5 is provided with fifteen memory regions FM1 through FM15 and the microprocessor 11 stores the received images in each of the memory regions FM1 through FM15 and evaluates the quality of each image. Further, the microprocessor 11 varies the display pattern of the images stored in the memory regions FM1 through FM15 by adjusting the frame speed r and the phase, determines the overall image quality of each display pattern and selects the display pattern having the highest overall score. Furthermore, following the selected pattern, the microprocessor 11 displays the oldest image among the stored images in the display 3 as is or maintains the same display.

Thus, images that show continuity in movement and that are of good quality are displayed in the display 3. Therefore, both conditions for high quality and smooth movement in the displayed images can be satisfied.

That is, the images shown by the display 3 lose their smoothness in movement only when the TV reception condition worsens while the vehicle is travelling and so, a static image is used instead of the poor quality image. Therefore, when some frames of the images are of poor quality, the images are displayed while reducing the frame speed r and adjusting the phase so that high quality images are obtained and smooth movement in the displayed images is maintained as much as possible. That is, because the unpleasant images can be removed without sacrificing the smoothness in the movement of the images, clear, continuous images can be provided to the viewers.

Because the image quality is determined based on the signal reception condition by measuring the field intensity of the reception signals, the image quality can be determined and evaluated easily.

That is, because the determination of the image quality usually entails a considerable amount of processing, the quality of the received image should be evaluated using a practical method such as by determining the image quality based on the condition of the reception signal. To put it more concretely, one effective way is to determine the quality of the reception image based on the field intensity described above. Other methods of determining image quality are as follows. The broadcast signals not only include an image signal period that contains the image signal information but also include a vertical synchronizing period, a horizontal synchronizing period and a pedestal period (burst signal, front porch, back porch). The vertical synchronizing period is divided into an equal pulse period, a vertical pulse period and a vertical blanking period (ghost clear signal, closed caption display and the like).

The ghost clear signal portions placed in the broadcasting signal are removed and processed using known technology, so that the time delay, strength and the number of reflection signals are detected and quality of the superposed reception caused by the ghosting effect can be estimated. Known technology such as a ghost canceler of a fixed location TV receiver is used for detecting the ghosting effect condition. Flickering and image roughness due to the fading effect are mainly due to the extreme weakness of the reception signal and so, such flickering and the roughness in the image can be estimated by detecting the field intensity of the received signals. That is, image quality can be quantified by extracting the image portion from the broadcasting signal and by detecting the minimum value and the average value of the level of the field intensity for such portion. When the received image has a portion in which the quality of the image deteriorates for an instant due to fading and ghosting effect or the like, the above-described procedures can be used to locate such frames in a position where they are discarded so that only images of high quality are displayed.

Furthermore, after detecting the stoppage of the vehicle, because the microprocessor 11 gives priority to the smoothness in the images when the vehicle is stopped than when the vehicle is moving, the same microprocessor increases the maximum frame speed r from 15 frames/second to 30 frames/second. Therefore, smoother images can be seen when the vehicle is at a stop. That is, because the received images of the TV receiver is impaired by the ghosting and the fading effects when the vehicle is in motion, reduction in the frame speed r would be an effective measure in obtaining smooth movements in the displayed images. However, while the vehicle is at rest, because the reception condition of the images is excellent, the range of the frame speed r is widened to 30 frames/second and thus, unnecessary reduction in the frame speed r is avoided and the image can be displayed at 30 frames/second when the reception condition is satisfactory.

Furthermore, because received images can be displayed in the display 3 in real-time with the actuation of the operation switch 13, TV signals which indicate time can be displayed without any delays.

Although the quality of the image is determined from the field intensity in the above embodiment, image quality can also be determined using other methods. Hereinafter, an image quality evaluation method other than the method described above is explained.

Here, roughness is computed as the correlation of the horizontal scanning lines of the display 3 with the lines below and above it. The lower this correlation value is, the greater the probability that there is noise in the image. That is, in a normal clear image, there is but a small variation between the horizontal scanning line and the scanning lines below and above it. Flicker effect can be determined based on such roughness of the image. Because a ghost image appears in the right side of the horizontal scanning lines when there is superposition of the displayed images, when the correlation of a target lying on one or more of the horizontal scanning lines with the image produced when the target is shifted a little is computed. If there is a peak in the correlation values, the ghost portion coincides with the shifted position where the peak value appears. Delays and the intensity of the ghost image can be determined based on such peak. However, in practical conditions, because the flickering and roughness (which can be attributed to the fading effect) and the superposition of the images (which can be attributed to the ghosting effect) appear together, the image quality can be expressed in terms of the weighted values of these separate detection value.

A second embodiment of the present invention is explained hereinafter. The differences between the first embodiment and the second embodiment are explained below.

Figure 12:
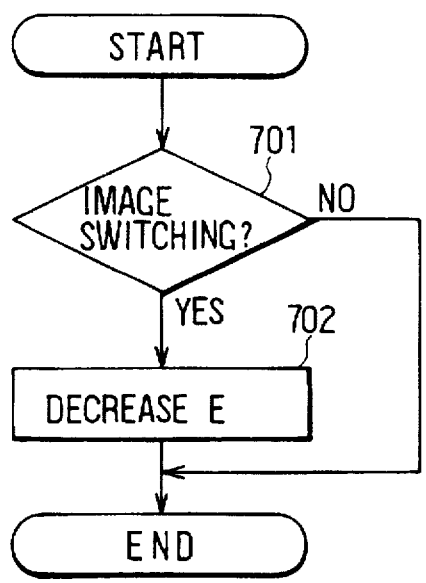
FIG. 12 is a flow chart of an image switching detection process executed by the microprocessor according to a second embodiment of the present invention.

While the overall scores of the combinations of frame speeds and the selected positions of the image have been determined and used in the first embodiment for determining the ideal setting for the frame speed r and the selected position, this process cannot always determine the optimal combination. In the present embodiment, the microprocessor 11 executes the process shown in FIG. 12. In this process, step 701 detects image switching. Here, image switching refers to starting the display of a different set of images such as when showing a scene different from the one displayed previously. When step 701 gives a positive output, control goes to step 702 which deliberately lowers the value of the image quality of the present frame and the previous and succeeding frames to lower the overall score N. Accordingly, a display pattern which allows the display of the frame (i.e., a display pattern in which the image usage rate C for the frame is 100%) that indicates the switching point will never be selected as the optimal display pattern. It must be noted here that while frames in the vicinity of the image switching point are skipped, frame speed r and selected position are chosen to place priority on the smoothness of the movement in the images.

FIGS. 13A and 13B illustrate the condition described above. FIG. 13A illustrates the received image. FIG. 13B illustrates the adjustment of the actual image quality near the vicinity of a switching point. The image qualities of frames in the vicinity of the switching point are reduced deliberately from their actual values in such a way that the nearer a frame is to the switching point, the larger its frame quality is reduced (D1<D2<D3, D5<D4<D3). Therefore, the frame images near the switching point will have little effect in the process of determining the frame speed r and the selected position of the image, i.e., the waveform pattern of the image usage rate C.

Here, as a method for detecting the switching point of the image pattern, the correlation and the image quality (reception condition) before and after each frame is determined. If the image quality (reception condition) for a certain frame and frames in its vicinity are no less than a predetermined level and the correlation values of images before and after such frame are low, such frame is set as the switching point.

When the display images are switched, even if the number of discarded frames is increased, the image will still look fine to the viewer. Therefore, with detection of the switching of the images, the number of images that may be discarded may be more than usual, and thus, there will be more waveform patterns of the image usage rate C to choose from.

Thus, in the present embodiment, when the microprocessor 11 detects the position of the switching of the frames, the frame in the switching position and frames before and after it are not displayed, and thus, if low quality images exist at the time of switching or before and after the switching of the frames, those low quality frames are not displayed.

Although the frame in the image switching position and the frames before and after it are not displayed in the present embodiment, it may also be that the only the frame at the switching position is not displayed.

A third embodiment of the present invention is explained hereinafter. First, differences between the first embodiment and the third embodiment are explained.

In the first embodiment, the frame speed r and the position are selected every time (1/30th of a second) an image is stored. That is, the first embodiment determines the optimal waveform pattern of the image usage rate C every time an image is stored. However, as shown in FIGS. 17A through 7C, the present embodiment selects the optimal display pattern (speed and position) for every 15 frames (every 0.5 second). That is, the present embodiment determines the optimal waveform pattern of the image usage rate C for every 15 frames.

Figure 14:
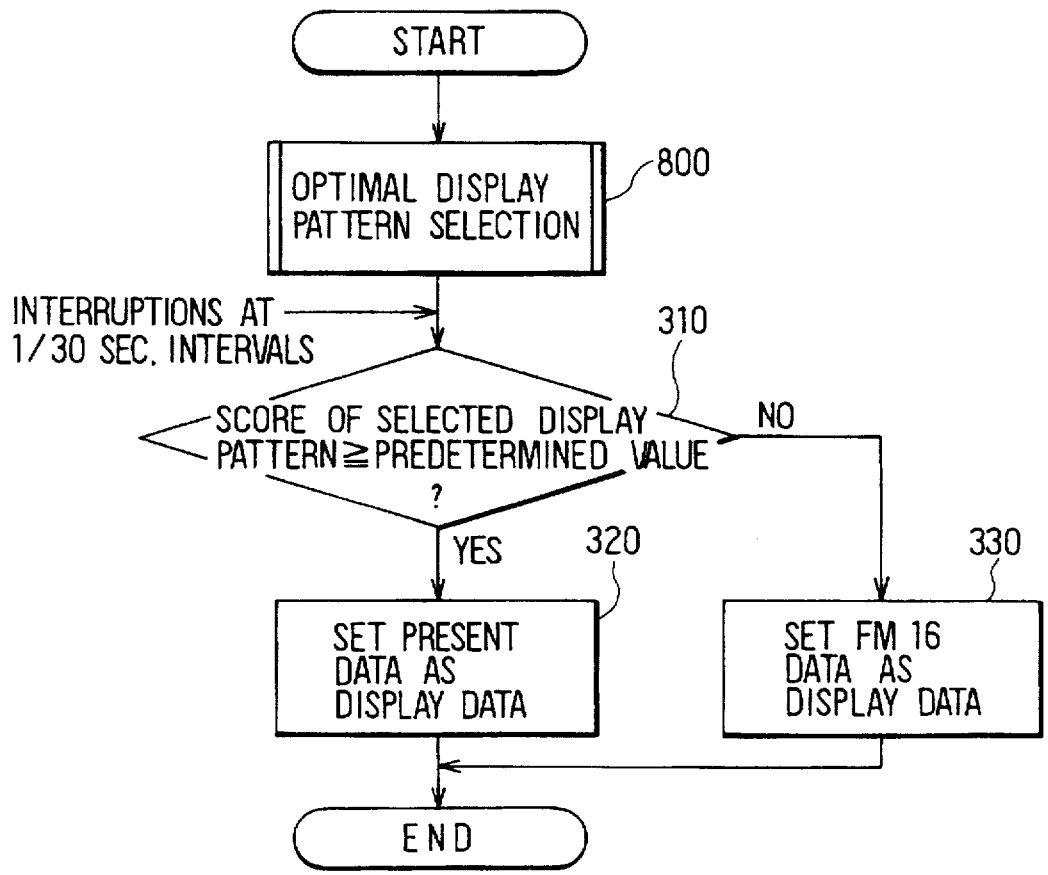
FIG. 14 is a flow chart of the main procedure executed by the microprocessor according to a third embodiment of the present invention.
Figure 15:
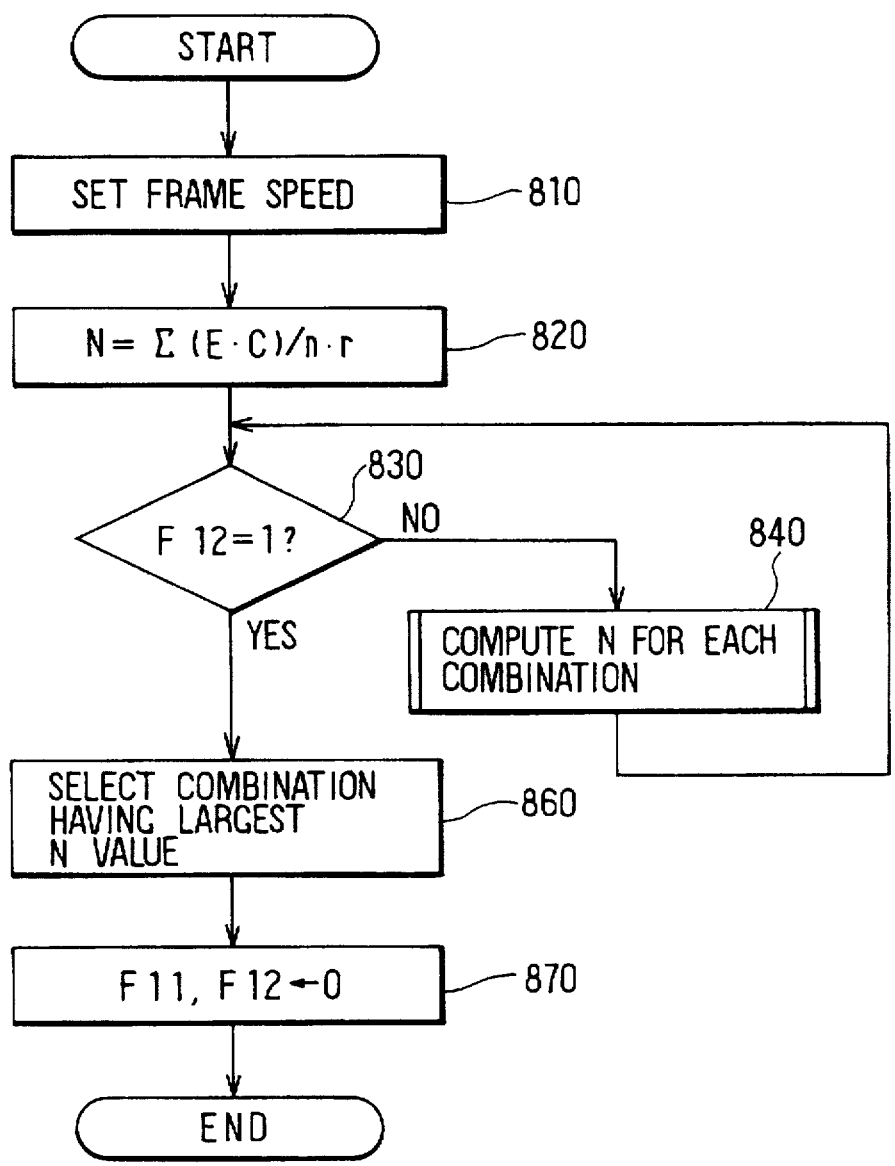
FIG. 15 is a flow chart of the optimal display pattern selection procedure executed by the microprocessor according to the third embodiment.
Figure 16:
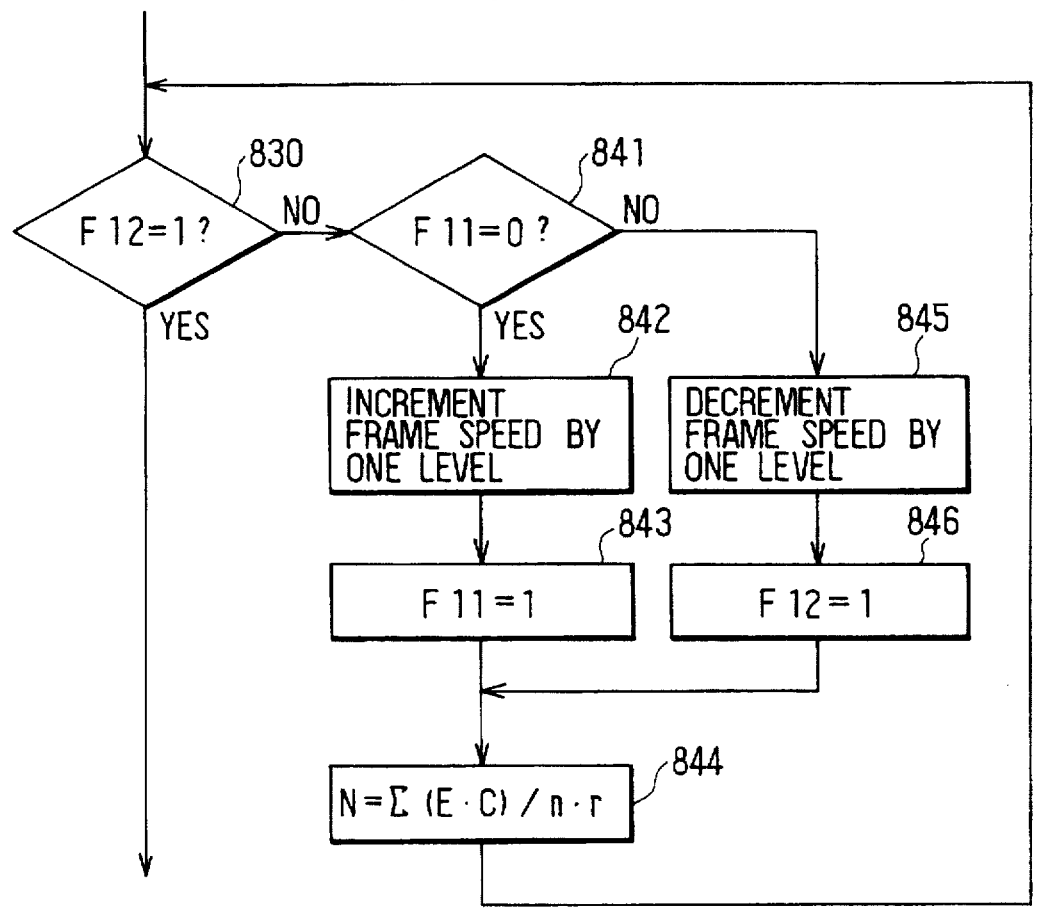
FIG. 16 is a flow chart of a frame speed adjustment operation executed by the microprocessor according to the third embodiment.
Figure 21:
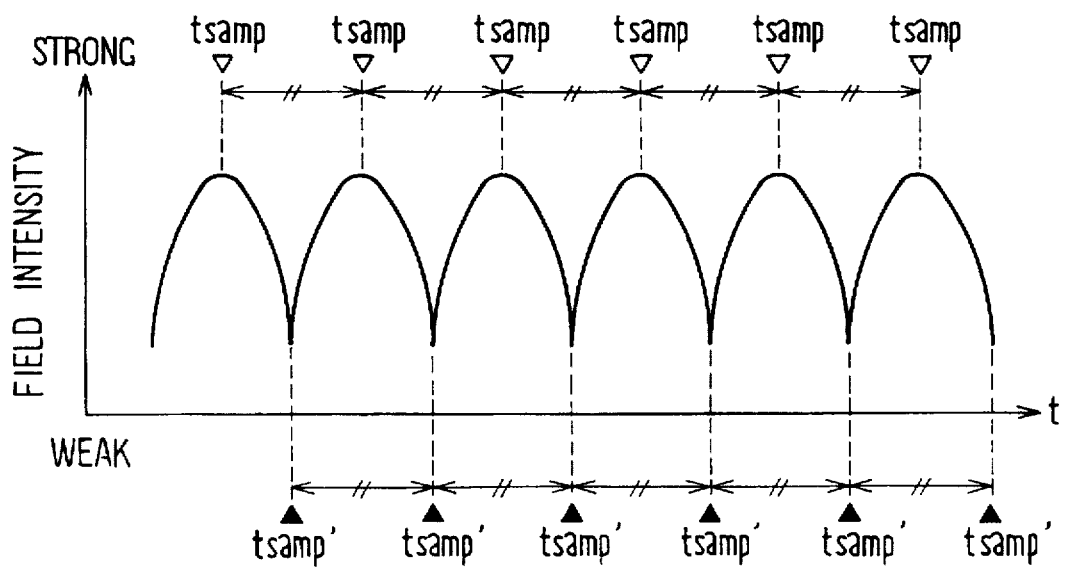
FIG. 21 is a time chart showing an operation of a prior art device.

FIGS. 14 through 16 are flow charts of processes that are executed by the microprocessor 11. In the process shown in FIG. 14 which is executed every 0.5 second, step 800 selects the optimal display pattern. FIG. 15 shows the procedure for selecting the optimal display pattern. In FIG. 15, step 810 determines the display pattern that results when the present frame speed r is maintained as shown in FIGS. 17A through 17C. In FIGS. 17A through 17C, the present frame speed r is set to 10 frames/second. The microprocessor 11 selects an image (high quality image) with the strongest field intensity for each block BL which is set in accordance with the frame speed r of 10 frames/second. Here, the frequency at which the image usage rate C becomes 100% is set in accordance with the frame speed r. Thus, with the present frame speed at 10 frames/second, the image usage rate C will be 100% for every set of three frames. Also, the image usage rate C is set to 100% at the frame having the maximum field intensity for every set of three frames. Step 820 computes the overall score N for the overall frame pattern. Step 830 determines whether or not a flag F12 is set and because the flag F12 is initially reset, control goes to step 840 which is shown in detail in FIG. 16. After step 841 determines that a flag F11 is reset, step 842 raises the frame speed r by one level and thus, the frame speed r is raised from 10 frames/second to 15 frames/second. The microprocessor 11 selects an image (high quality image) having the strongest field intensity for each block BL which is set in accordance with the frame speed r of 15 frames/second. FIGS. 18A through 18C illustrate the frame patterns when the frame speed r is 15 frames/second. Here, the image usage rate C becomes 100% for every set of two frames with the peak of the image usage rate C corresponding to the frame that has the higher field intensity among each set of two frames. In this way, FIGS. 18A through 18C illustrate the display pattern when the frame speed r is raised by one level.

Step 843 sets the flag F11. Furthermore, step 844 computes the overall score N for the frame pattern and after which control returns to step 830.

Figures 19A, 19B, 19C:
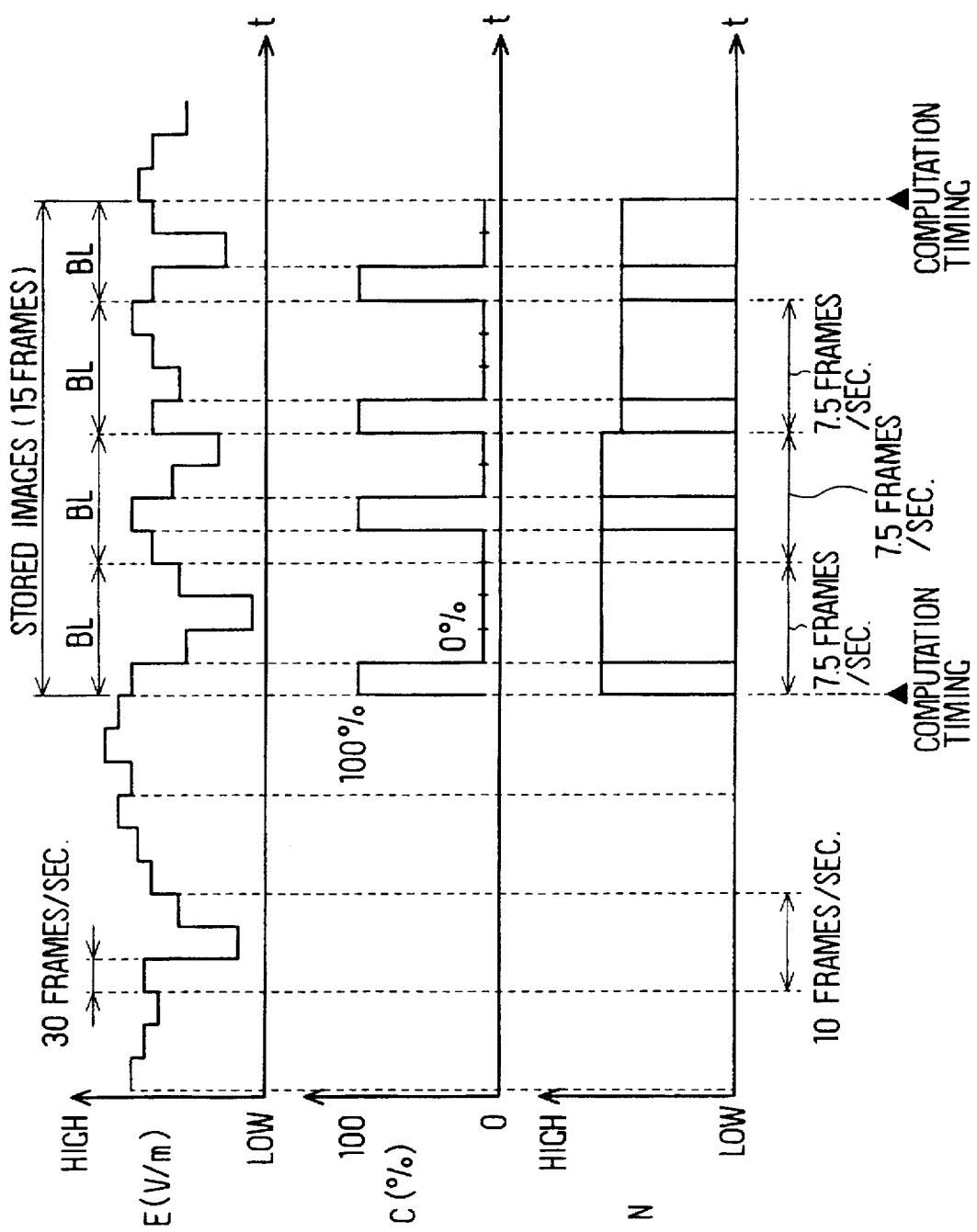
FIGS. 19A to 19C are time charts showing the operation of the microprocessor according to the third embodiment.

Because the flag F11 is set, control goes to step 845 via steps 830 and 841. Step 845 reduces the frame speed r by one level from 10 frames/second to 7.5 frames/second. The microprocessor 11 selects an image (high quality image) having the strongest field intensity for each block BL which is set in accordance with the frame speed r of 7.5 frames/second. In this way, the image usage rate C becomes 100% for every set of four frames with the waveform of the image usage rate C having peaks that correspond to the frame having the maximum field intensity for each set of four frames. In this way, FIGS. 19A through 19C show the display pattern when the frame speed r is reduced by one level.

Step 846 sets the flag F12 while step 844 computes the overall score N of the display pattern and after which, control returns to step 830.

After step 830 determines that the flag F12 is set, step 860 selects the pattern that has the largest overall score N among the three patterns described above. In this way, step 860 determines which waveform pattern of the image usage rate C results in the highest overall score N. Step 870 resets each of the flags F11 and F12.

Step 310 determines whether or not the score of the pattern selected in step 800 is greater than or equal to a predetermined value. When the score of the pattern is greater than or equal to the predetermined value, the microprocessor 11 controls the output control circuit 8 to send the oldest image among the images stored in the image memory unit 5 to the memory region FM16 in accordance with the selected display pattern. When the score of the pattern is selected by step 310 is less than the predetermined value, step 330 sets the transmission inhibiting mode for controlling the output control circuit 8 so that the frame data stored in the memory region FM16 becomes the display data.

The microprocessor 11 executes steps 310 through 330 every 1/30th of a second to store necessary frame data in memory region FM16 and control the display operation of the display 3 so that all frames in the selected display pattern are displayed sequentially starting from the oldest image.

The process of FIG. 14 is executed every 0.5 second. In this way, the frames are arranged into blocks and the frame having the best image quality for each block can be selected and displayed. In this case, the level of continuity between the frames images is reduced a little compared to the first embodiment; however, such problem can be handled by increasing the frame speed r.

It must be noted here that the reading of the field intensity E which is performed in step 100 of FIG. 2 is executed every 1/30th of a second.

In this way, in synchronization with the reception of the frames to be stored in the memory regions FM1 through FM 15, the microprocessor 11 evaluates the frame speed r and the frame quality of each pattern for the case when the present frame speed r is maintained and the case when the frame speed r is changed, and selects the pattern having the highest score.

In the present embodiment, there is no need to always update the oldest image in the image memory unit 5 every time a new image is received. The important thing is that 15 frames of images are stored sequentially.

Although the present invention has been fully described in connection with preferred embodiments thereof with reference to the accompanying drawings, it is to be noted that various changes and modifications will become apparent to those skilled in the art.

There is no need to limit the setting of the number of frames to be stored in the image memory unit to 15 frames. For example, image patterns lasting between 0.5 to 1 second (fifteen to thirty frames) can be stored. The more stored frames there are, the more precisely the frame speed r and the selected position of the frame can be adjusted. However, such processing may bring about some delay in displaying the image.

In the first embodiment, the frame speeds and the phase of the image patterns are varied and evaluation of the different frame speeds and determination of the image quality for each display pattern are carried out to select the pattern that has the highest score. It may also be that the display patterns are varied by adjusting only one of the frame speed r and the phase and selecting and the display pattern having the highest score.

Furthermore, although the TV receiver here is installed in a vehicle, the TV receiver may also be used in other mobile bodies such as a ship or the like.

Such changes and modifications are to be understood as being within the scope of the present invention as defined by the appended claims.

What is claimed is:

1. A TV receiver for use in a mobile body, said TV receiver comprising:
   reception means for receiving a TV signal which carries a set of static frame images per unit time;
   display means for displaying said static frame images received by said reception means;
   memory means for sequentially storing said set of static frame images received by said reception means;

image quality detection means for detecting image quality of each of said static frame images stored in said memory means;

pattern selection means for determining an optimal display pattern for displaying said set of static frame images in said display means by setting at least one of a frame speed and a frame display position to different values to obtain a plurality of display patterns and obtaining an evaluation value of each of said display patterns based on said image quality detected by said image quality detection means, said frame speed being a speed for displaying said static frame images in said display means, said frame display position indicating which of said static frame images will be displayed in said display means; and control means for controlling said display means to display said static frame images stored in said memory means based on said optimal display pattern determined by said pattern selection means.

2. A TV receiver according to claim 1, wherein said image quality detection means detects said image quality based on a reception condition of each of said static images received by said reception means.

3. A TV receiver according to claim 2, wherein said image quality detection means detects said image quality based on a field intensity of said received static image frames.

4. A TV receiver according to claim 3, wherein said pattern selection means is further for dividing said set of static frame images into a plurality of blocks based on said frame speed and for designating a position of a static frame image having a maximum field intensity in each of said blocks as said frame display position.

5. A TV receiver according to claim 2, wherein said image quality detection means detects said image quality based on a ghost clear signal in said TV signal received by said reception means.

6. A TV receiver according to claim 1, said TV receiver further comprising:

vehicle stoppage detection means for detecting a stoppage in movement of said mobile body;

wherein said pattern selection means is for setting said frame speed to a predetermined maximum value when said vehicle stoppage detection means detects said stoppage, said maximum value being more than a largest value of said frame speed when said mobile body is moving.

7. A TV receiver according to claim 1, said TV receiver further comprising a real-time display switch for inhibiting said control means from controlling said display means and for connecting said display means directly to said reception means to display said static frame images in real time.

8. A TV receiver according to claim 1, wherein said pattern selection means is further for detecting a switching image frame indicative of an image switching point within said set of static frame images received by said reception means and for inhibiting said display means from displaying said switching image frame.

9. A TV receiver according to claim 1, wherein said pattern selection means is further for detecting a switching image frame indicative of an image switching point within said set of static frame images received by said reception means and for inhibiting said display means from displaying said switching image frame and image frames proximate to said switching frame.

10. A TV receiver according to claim 1, wherein said control means is for controlling said display means to display said static frame images stored in said memory means based on said optimal display pattern when said evaluation value of said optimal display pattern is greater than a predetermined value.

11. A TV receiver according to claim 10, wherein said control means is for controlling said display means to continue displaying the same image frame unless said evaluation value of said optimal display pattern is greater than said predetermined value.

12. A TV receiver according to claim 1, wherein:

said pattern selection means obtains said plurality of display patterns by at least one of decreasing frame speed, increasing frame speed and shifting said display frame position.

13. A TV receiver according to claim 1, wherein said pattern selection means determines said evaluation score based on said image quality detected by said image quality detection means, said frame speed and a number of said display frame positions within said set of static frames.

* * * * *